United States Patent [19]

Peters et al.

[11] Patent Number: 4,950,948
[45] Date of Patent: Aug. 21, 1990

[54] MANGANESE ACTIVATED ZINC SILICATE PHOSPHOR

[75] Inventors: Thomas E. Peters, Chelmsford; Roger B. Hunt, Medfield; A. Gary Sigai, Lexington, all of Mass.

[73] Assignee: GTE Laboratories Incorporated, Waltham, Mass.

[21] Appl. No.: 406,884

[22] Filed: Sep. 11, 1989

Related U.S. Application Data

[63] Continuation of Ser. No. 267,834, Nov. 7, 1988, abandoned.

[51] Int. Cl.$^5$ ............................................. H01J 61/44
[52] U.S. Cl. .................................................. 313/486
[58] Field of Search ........................ 313/485, 486, 487

[56] References Cited

U.S. PATENT DOCUMENTS

| | | | |
|---|---|---|---|
| 2,109,984 | 3/1938 | Alcher | 91/70 |
| 2,151,496 | 3/1939 | Beese | 176/122 |
| 2,206,280 | 7/1940 | Froelich | 250/81 |
| 2,210,087 | 8/1940 | Leverenz | 250/81 |
| 2,222,509 | 11/1940 | Isenberg | 250/81 |
| 2,241,939 | 5/1941 | Aschermann et al. | 250/81 |
| 2,245,414 | 6/1941 | Roberts | 250/81 |
| 2,247,192 | 6/1941 | Fonda | 250/81 |
| 2,309,676 | 2/1943 | Schmidling | 176/122 |
| 2,554,999 | 5/1951 | Merrill et al. | 252/301.6 |
| 2,656,320 | 10/1953 | Nagy et al. | 252/301.6 |
| 3,114,067 | 12/1963 | Henderson | 313/109 |
| 3,535,267 | 10/1970 | Sarver | 252/301.6 |
| 3,886,396 | 5/1975 | Hammer et al. | 313/486 |
| 3,995,191 | 11/1976 | Kaduk et al. | 313/485 |
| 4,208,448 | 6/1980 | Panaccione | 427/67 |
| 4,459,507 | 7/1984 | Flaherty | 313/489 |
| 4,585,673 | 4/1986 | Sigai | 427/213 |
| 4,710,674 | 12/1987 | Sigai | 313/489 |
| 4,797,594 | 1/1989 | Sigai et al. | 313/486 X |

FOREIGN PATENT DOCUMENTS 2450435 4/1976 Fed. Rep. of Germany.

OTHER PUBLICATIONS

Butler, K. H., Fluorescent Lamp Phosphors Technology and Theory, Penn. State Univ. Press, 1980, p. 94.
N. M. Korablev et al., Kinetics of Formation of a Phosphor Based on Zinc Orthosilicate, J. Appl. Chem. of USSR, 52 (9), Part 1, 1855–59 (1979).
E. F. Lowry, The Long-Term Deterioration in Certain Phosphors Exposed to the Low Pressure Mercury Arc, Determination in Certain Phosphors, vol. 95, No. 5, 242–253 (1949).
I. Takamori et al., Phase Transitions and Thermo Luminescence of a Plasma-Sprayed Zinc Silicate Phosphor, Communication of the Am. Ceramic Soc., pp. C-12-7-C-129 (1983).
W. Lehmann, An Analysis of Color-Changing Penetration-Type Cathodoluminescent Phosphor Screens, J. Elec. Chem. Soc., pp. 1787–1791 (1981).
J. Hurd et al., Activation of Thin Film $ZN_2S.O_4$ Phosphors Using Ion Implantation Techniques, J. Vacuum Science and Technology, vol. 13, No. 1, pp. 410–413 (1976).
Y. Uehara et al., A Study of Fluorescent Substances in a Fluorescent Spectrum of $ZnO-SiO_2$ Group Fluorescent Materials, J. Chem. Soc., Japan, 46, pp. 907–918 (1940).

Primary Examiner—Sandra L. O'Shea
Attorney, Agent, or Firm—Carl F. Ruoff; Frances P. Craig

[57] ABSTRACT

A new and improved manganese activated zinc silicate phosphor is described. The phosphor has cations consisting essentially of zinc, silicon, manganese, and tungsten. The phosphor has an absolute reflectance less than or equal to 13.5% at 275 nm, an absolute reflectance equal to or greater than 80% at 350 nm, and a surface area from about 0.3 m$^2$/gm to about 0.4 m$^2$gm.

9 Claims, 3 Drawing Sheets

MANGANESE ACTIVATED ZINC SILICATE PHOSPHOR

This is a continuation Ser. No. 267,834 filed Nov. 7, 1988 now abandoned.

FIELD OF THE INVENTION

This invention relates to a phosphor. More particularly, this invention relates to a manganese activated zinc silicate phosphor.

BACKGROUND OF THE INVENTION

This invention is concerned with a manganese-activated zinc orthosilicate phosphor, $Zn_2SiO_4$:Mn. The phosphor emits in the green region of the visible spectrum and is used, for example, in fluorescent lamps and cathode ray tubes.

Some of the problems associated with $Zn_2SiO_4$:Mn phosphors are their relatively poor fluorescent lamp performance and maintenance. Poor maintenance means that the light output, or lumens per watt, of the phosphor decreases to a greater extent during lamp life than is desirable. This invention is concerned with a manganese-activated zinc silicate phosphor having an improved reflectivity resulting in an improved fluorescence efficiency.

The importance of high-performance, green-emitting phosphors with low depreciation characteristics in fluorescent lamps, has increased in recent years with the growing demand for high CRI performance lamps. For that reason, in particular, an improved manganese-activated zinc orthosilicate phosphor would represent a significant advancement in the art.

SUMMARY OF THE INVENTION

In accordance with one aspect of the present invention, a new and improved manganese activated zinc silicate phosphor consists essentially of cations of zinc, silicon, manganese, and tungsten. The phosphor has an absolute reflectance less than or equal to 13.5% at 275 nm, an absolute reflectance equal to or greater than 80% at 350 nm.

In accordance with another aspect of the present invention a new and improved manganese activated zinc silicate phosphor having cations consisting essentially of zinc, silicon, manganese, and tungsten is prepared by a method which comprises the following steps:

Step 1—The phosphor powder is heated in a furnace to a temperature of about 1000° C. to about 1225° C. in air.

Step 2—The phosphor powder from Step 1 is cooled.

Step 3—The phosphor powder from Step 2 is wet milled in an acid solution.

Step 4—The phosphor powder from Step 3 is separated from the acid solution.

Step 5—The phosphor powder from Step 4 is washed with water.

Step 6—The phosphor powder from Step 5 is dried to form a manganese activated zinc silicate phosphor powder having individual particles, a 350 nm reflectance equal to or greater than 80%, a 275 nm reflectance equal to or less than 13.5%, and a surface area from about $0.3m^2$/gm to about $0.4m^2$/gm.

Step 7—The individual particles of the manganese activated zinc silicate phosphor powder are coated with a continuous coating of alumina to form a manganese activated zinc silicate phosphor powder having a continuous coating of alumina on the individual particles.

Step 8—The manganese activated zinc silicate phosphor powder having a continuous coating of alumina on said individual particles is annealed at a temperature of about 700° C. to about 850° C. for a period of about 15 min. to about 20 hours to form an annealed coated phosphor.

In accordance with another aspect of the present invention a new and improved manganese activated zinc silicate phosphor having cations consisting essentially of zinc, silicon, manganese, and tungsten is prepared by a method which comprises the following steps:

Step 1—The phosphor powder is heated in a furnace to a temperature of about 1000° C to about 1225° C. in air.

Step 2—The phosphor powder from Step 1 is cooled.

Step 3—The phosphor powder from Step 2 is wet milled in an acid solution.

Step 4—The phosphor powder from Step 3 is separated from the acid solution.

Step 5—The phosphor powder from Step 4 is washed with water.

Step 6—The phosphor powder from Step 5 is dried.

Step 7—$NH_4Cl$ is added to the phosphor powder from Step 6 to form a mixture of the $NH_4Cl$ and the phosphor powder.

Step 8—The mixture of the $NH_4Cl$ and the phosphor powder from Step 7 is heated in a furnace to a temperature of about 1000° C. in air.

Step 9—The phosphor powder from Step 8 is cooled.

Step 10—The phosphor powder from Step 9 is wet milled in an acid solution.

Step 11—The phosphor powder from Step 10 is separated from the acid solution.

Step 12—The phosphor powder from Step 11 is washed with water.

Step 13—The phosphor powder from Step 12 is dried to form a manganese activated zinc silicate phosphor powder having individual particles, a 350 nm reflectance equal to or greater than 80%, a 275 nm reflectance equal to or less than 13.5%, and a surface area from about $0.3m^2$/gm $0.4m^2$/gm.

Step 14—The individual particles of the manganese activated zinc silicate phosphor powder are coated with a continuous coating of alumina to form a manganese activated zinc silicate phosphor powder having a continuous coating of alumina on the individual particles.

Step 15—The manganese activated zinc silicate phosphor powder having a continuous coating of alumina on said individual particles is annealed at a temperature of about 700° C. to about 850° C. for a period of about 15 min. to about 20 hours to form an annealed coated phosphor.

BRIEF DESCRIPTION OF THE DRAWING

In the drawing.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENTS

A new and improved virgin manganese activated zinc silicate phosphor is described. By virtue of the physical and chemical characteristics of the new and improved phosphor, it is capable of withstanding the rigors of the application of a chemical vapor deposited (CVD) coating of alumina, a thermal annealing process necessary to bond the coating to the phosphor particles, and the processing into a 40W-T12 lamp and maintaining a desirable zero hour lumen output (brightness). The method of preparing this new and improved phosphor is not important as long as the product has the following attributes:

(1) no substantial cations other than Zn, Si, Mn, and W;
(2) an absolute reflectance at 275 nm of equal to or less than 13%;
(3) an absolute reflectance at 350 nm of equal to or more than 80%; and
(4) a surface area of 0.3 to 0.4 $m^2/gm$ as determined by a single point BET measurement on a Quantachrome Monosorb surface area instrument.

The virgin manganese activated zinc silicate phosphor can be defined and identified by its cation composition. The cation composition consists essentially of: zinc, silicon, manganese, and tungsten. The term "cation" as used to describe elements present in the phosphor composition means the elements present in the phosphor composition other than oxygen.

One aspect of the invention provides a simple measurement that determines the optical reflection of the virgin (as synthesized) phosphor at 275 nm and 350 nm and permits the estimation of the minimum performance level of certain alumina coated and annealed manganese activated zinc silicate phosphors in 40W-T12 lamps. Moreover, when it is used in conjunction with a performance standard such as the zero hour lumen level of the 40W-T12 lamp, the reflectance measurement permits phosphors that would fall below the desired zero hour lumen level to be identified and eliminated before the added costs of alumina coating, annealing, and lamp processing are incurred. The success of this technique is surprising because it is contrary to the commonly accepted view which holds that measurements performed on a phosphor outside the lamp envelope are of little value in predicting it lamp performance.

The reflectance measurements were obtained with a Spex Industries Model 1902 spectrofluorimeter. The emission and excitation monochromators were scanned in tandem through the spectral range of interest. The excitation source was a 450 Watt Xenon arc lamp. The phosphor powder samples to be measured were pressed into anodized aluminum plugs and mounted in the sample compartment of the spectro-fluorimeter. The incident beam of the spectrofluorimeter impinged the sample at $-22.5°$ from normal and the scattered light was collected at 22.5° such that the incident and reflected rays subtend a 45° angle bisected by the sample face normal. A Kodak reflectance standard powder (#6091) was prepared as described above for the powder sample. A "standard" raw reflectance spectrum was acquired and stored under computer control. Then the sample was measured in an identical fashion. The spectrum of the sample is divided by the spectrum of the Kodak standard (taken to be unity) to derive a corrected reflectance values shown in FIG. 1 and 2.

Another aspect of the invention provides a method of phosphor treatment that can be applied to sub-standard virgin manganese activated zinc silicate phosphors to improve their performance after they have been alumina coated, annealed, and processed into lamps. Still further aspects and details of the invention are described in the following paragraphs.

Figure 1:
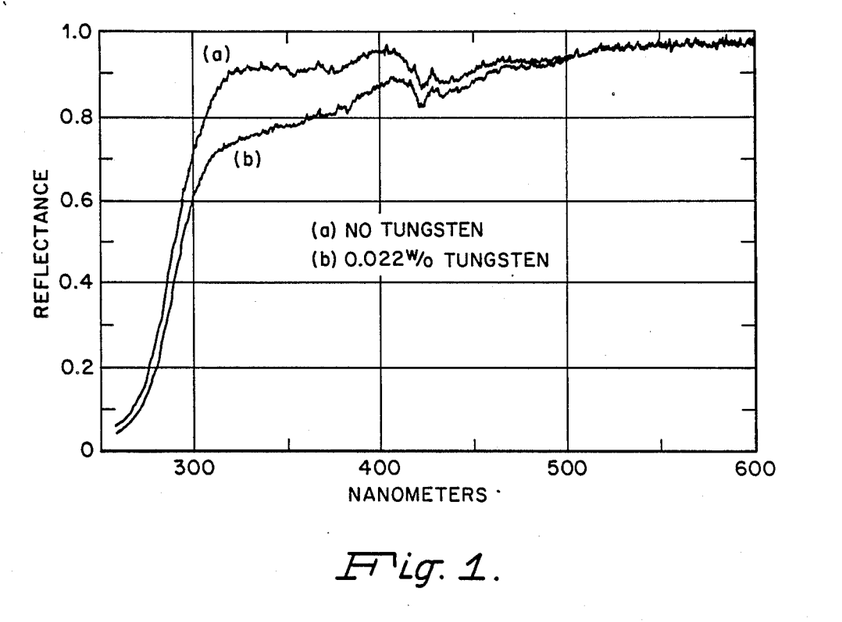
FIG. 1 a curve of the optical reflectance of a virgin manganese activated zinc silicate phosphor in the 250-600 nm region of the spectrum in accordance with the present invention. Curve (a) is the optical reflectance of a virgin manganese activated zinc silicate phosphor which does not contain tungsten and curve (b) is the optical reflectance of a virgin manganese activated zinc silicate phosphor containing 0.022 wt % tungsten.
Figure 2:
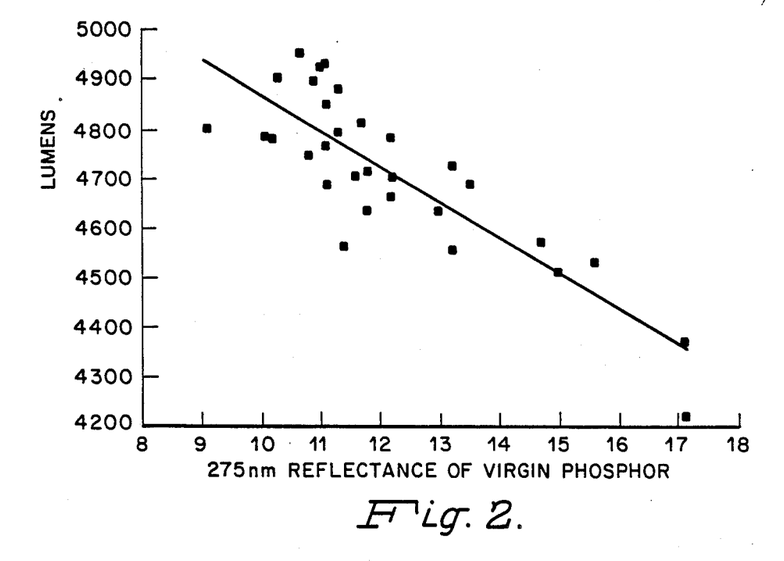
FIG. 2 a curve of 40W-T12 lamp zero hour lumen output (brightness) of alumina coated and annealed manganese activated zinc silicate phosphors as a function of the 275 nm reflectance of the virgin manganese activated zinc silicate phosphor from which they were derived in accordance with the present invention.
Figure 3:
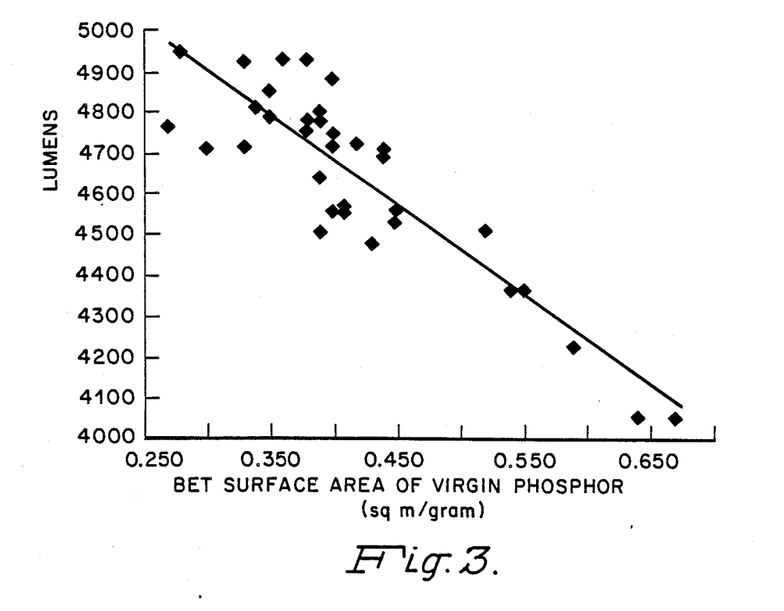
FIG. 3 of 40W-T12 lamp zero hour lumen output (brightness) of alumina coated and annealed manganese activated zinc silicate phosphors as a function of the BET surface area of the phosphor in accordance with the present invention.

Curve (a) in FIG. 1, shows the optical reflectance in the 250–600 nm region of the spectrum of a virgin manganese activated zinc silicate phosphor containing no tungsten. The small dips in reflectance in the 330–420 nm range are due to $Mn^{2+}$ absorptions, while the stronger drop below 330 nm can be attributed to host lattice absorption, modified by the presence of the Mn activator. For virgin zinc silicate phosphors activated with approximately 3.3 wt % Mn and containing no tungsten, that are substantially free cations other than Zn, Si, and Mn the reflectance at 275 nm can be used as a guideline to estimate the zero lumen level of the alumina coated and annealed manganese activated zinc silicate phosphors from which they were derived. Once the 275 nm reflectance of a virgin phosphor has been determined, the relationship depicted in FIG. 2 can be used to estimate the zero hour lumen level of the phosphor in the alumina coated and annealed condition. In FIG. 1 curve (b), we present the reflectance of a virgin manganese activated zinc silicate consisting essentially of cations of zinc, silicon, manganese, and tungsten. As observed in FIG. 1 curve (b), a new absorption in the 300–400 nm range is associated with the presence of tungsten in phosphors of this type. This absorption has been found to reduce the actual zero hour lumen level of the alumina coated and annealed phosphors by as much as 300 lumens below that predicted by the 275 nm reflectance measurement because of the body color induced during the annealing step.

Generally speaking, maximum zero hour lumen level (brightness) can be obtained from alumina coated and annealed virgin manganese activated zinc silicate phosphors, when the 275nm reflectance of the virgin phosphor is as low as possible (preferable equal to or less than 13.5%), the BET surface area is low (preferably from 0.3 to 0.4 $m^2/gm$) and the 350 nm reflectance is as high as possible (preferably equal to or greater than 80%). However, virgin phosphors typically exhibit 275 nm reflectances as high as 17%, BET surface areas of 0.6 $m^2/gm$ or higher, and when significant amounts of tungsten are present, 350 nm reflectances as low as 67%. Accordingly, another aspect of the invention provides a method of adjusting the reflectances and BET surface area of virgin phosphors that do not meet the desired specifications. This tailoring process involves a complex combination of thermal treatments, chemical processes, and wet milling procedures that are described in more detail in Examples 1 and 2 and in Tables I and II.

In Table I, a virgin manganese activated zinc silicate phosphor was processed as described in Example 1 at various heating times except for Sample #1 which was not subjected to the heat treatment of the other Samples. Sample #1 was alumina coated, annealed, and processed into a lamp and is the control for comparing the effects of the heat treatment on the other parameters measured.

TABLE I

Reflectance and Surface Area and Lumens As a Function of Heating Time

| Sample No. | Process Heating Time @ 1225° C. | 275 nm Refl. % | 350 nm Refl. % | BET Surface Area m²/gm | 40W-T12 Lamp 0 Hr Lumens | Wt % W | Wt % Mn |
| --- | --- | --- | --- | --- | --- | --- | --- |
| #1 | 0 hrs | 16.0 | 73.0 | 0.54 | 4362 | 0.057 | 3.3 |
| #2 | 4 hrs | 13.5 | 89.4 | 0.44 | 4687 | 0.04 | 2.7 |
| #3 | 6 hrs | 13.2 | 83.8 | 0.42 | 4722 | | |
| #4 | 7 hrs | 11.7 | 84.1 | 0.34 | 4810 | | |
| #5 | 8 hrs | 11.1 | 80.9 | 0.35 | 4849 | 0.04 | 2.81 |
| #6 | 16 hrs | 10.0 | 75.0 | 0.28 | 4782 | 0.03 | 2.53 |
| #7(a) | 16 hrs 2 hrs | 10.7 | 82.9 | 0.28 | 4949 | | |

(a)two step firing;
1st: 1225° C. - 16 hrs. in air
2nd: 1000° C. - 2 hrs. in air with 2 wt % NH$_4$Cl

EXAMPLE 1

Approximately 0.5 Kg. of a virgin manganese activated zinc silicate phosphor having cations consisting essentially of zinc, silicon, manganese, and tungsten was placed in a quartz boat and heated at 20° C./min to a temperature of 1225° C., in an ambient of static air. The phosphor was held at that temperature for a predetermined period, ranging from 4 to 16 Hrs., and was then cooled at 20° C./min to 900° C. and removed from the furnace.

After cooling to room temperature, the partially sintered phosphor cake was roll crushed to a powder and sieved through a 60 mesh screen. The phosphor was subsequently loaded into a 2 liter (4.5"dia.×9"ht.) polyethylene mill jar containing 600 ml of citric acid solution (0.48w/o citric acid/gm phosphor) and 0.5 Kg. of Burundum (Tradename of U.S. Stonewear) grinding (0.5"dia.×0.5"ht.) cylinders and rolled at 91 rpm for 30 min. Upon completion of this mill-wash process, the phosphor was separated from the citric acid solution and re-dispersed in 1.0 liter of distilled water. The phosphor was allowed to settle for 15 minutes and most of the liquid was decanted off, together with some of the fine phosphor particles that remained in suspension. The water dispersion and decanting process was then repeated a second time and was followed by a final dispersion in water and subsequent washing and suction drying on a buchner funnel. The phosphor received a final drying process in a 100° C. oven for at least 3 hours, and was ready for use after sieving through a 400 mesh screen.

A chemical vapor deposited (CVD) alumina coating was applied to the heat treated phosphor particles utilizing a fluid bed coating technique. As shown in Table II, Samples No. 2–7, a blend of approximately 300 gms to 375 gms of the heat treated phosphor and approximately 0.05% by weight of a fluidization aid such as Aluminum Oxide C, available from Degussa, Inc., was loaded into a fluid bed column comprising a 40 millimeter ID quartz tube having a quartz frit fused to the bottom acting as a distributor plate. A 32 millimeter quartz agitator disc was positioned inside the quartz tube. The agitator disc was attached to a vibromixer agitator. Approximately 50 millimeters from the base of the agitator a series of five holes of approximately 20 mils in diameter (0.5 millimeter) are circumferentially located on the agitator shaft. The agitator disc itself was located approximately 25 millimeters above the quartz distributor. A series of approximately six copper coil windings of ¼" tubing were located immediately around the frit located at the bottom of the quartz tube such that one coil was below the distributor and the remaining five coils were above the distributor plate. The total length of the coil assembly was approximately 55 millimeters of which approximately 45 millimeters were above the distributor plate. In addition, there was a copper foil of approximately 70 millimeters which was sandwiched between the cooling coil and the quartz tube to provide improved heat transfer. In addition there was insulation located above the copper coil windings to further reduce heat transfer between the heated and the unheated portions of the tube. This insulation comprised approximately 50 millimeters of 1" wide by ½" thick Fiberfax roll insulation. The edge of the Fiberfax insulation matched exactly the level between the unheated and heated part of the 3-Zone Lindberg furnace, that is, between the bottom and center zones of the furnace. The furnace zones were 6", 12", and 6"in length, and a spike thermocouple was located at the midpoint of each zone. The operating conditions for the fluid bed CVD alumina coating of the phosphor are show in Table II. The height of the phosphor bed was from 300 mm to 400 mm. The amount of phosphor charged into the column was from 300 gm to 375 gm. The external thermocouple was located against the outside wall of the quartz column level with the 5 holes in the agitator shaft where the oxygen/inert gas mixture enters the fluidized phosphor bed. The temperatures recorded by the external thermocouple during the coating operation ranged from 342° C. to 435° C. as shown in Table II. The first two furnace zones were set for 500° C. and the last zone was shut off. The flow rates shown in Table II ranging from 250 cc/min to 350 cc/min of an inert gas such as nitrogen, argon, helium, neon, or mixtures thereof for the bubbler and from 300 cc/min to 400 cc/min of the inert gas for the carrier were the flow rates that pass through the distributor plate at the bottom of the quartz column. A fluidized phosphor bed was formed by passing the inert gas upwardly through the phosphor particles in order to suspend the particles in the inert gas stream. In addition to supporting the phosphor particles in a fluidized bed, the inert gas functions as a carrier gas for the vaporized trimethyl aluminum. The inert gas was passed through the bubbler containing liquid trimethyl aluminum at approximately 30° C. and the liquid trimethyl aluminum was vaporized into the inert gas before passing through the distributor plate into the fluidized phosphor bed. Oxygen as a inert gas/oxygen mixture was also introduced into the fluidized bed through holes circumferentially located on the shaft of the vibrating mixer above the vibrating disc. A continuous protective alumina coating was formed on the surface of the individual phosphor particles when the vaporized trimethyl aluminum was exposed to the oxygen at a temperature sufficient for a reaction between the oxygen and the vaporized trimethyl aluminum to occur. The coating times ranged from 5.67 hours to about 7.5 hours as indicated in Table II. Once the phosphor particles were coated with a continuous coating of alumina, they were transferred into a quartz boat and annealed at 768° C. in static air and held at that temperature for 4 hours in a Rapid-Temp furnace. There is approximately a one hour linear ramp and cool down time programmed into the annealing heating cycle. The annealing temperature can be from about 700° C. to about 850° C. and the period of time held at temperature can be from about 15 minutes to about 20 hours. After the annealing step, at least one layer of the phosphor was coated in a 40W-T12 lamp using a conventional water base suspension system. The coated 40W-T12 lamp was then processed into a finished 40W-T12 lamp and zero hour lumen data was obtained, shown in Table I.

In addition, at least one layer of a blend of phosphors, one of which being the phosphor of this invention, can be coated in a 40W-T12 lamp.

The control, Sample No. 1, was processed through a large fluid bed column rather than the 40 millimeters column described above to deposit a continuous coating on the phosphor particles of the control Sample No. 1. As shown in Table II, a blend of approximately 1500 gms of the control phosphor, Sample #1, and approximately 0.05% by weight of a fluidization aid such as Aluminum Oxide C, available from Degussa, Inc., was loaded into a fluid bed column comprising a 80 millimeter ID quartz tube having a quartz frit fused to the bottom acting as a distributor plate. A 65 millimeter stainless steel agitator disc was positioned inside the quartz tube. The agitator disc was attached to a vibromixer agitator. Approximately 50 millimeters from the base of the agitator a two micron stainless steel filter element was welded in line and functioned as the diffuser of the oxygen mixture. The agitator disc itself was located approximately 25 millimeters above the quartz distributor. A series of approximately eleven copper coil windings of ¼" tubing were located immediately around the frit located at the bottom of the quartz tube such that one coil was below the distributor and the remaining ten coils were above the distributor plate. In addition, there was a copper foil of approximately 120 millimeters which was sandwiched between the cooling coil and the quartz tube to provide improved heat transfer. In addition there was insulation located above the copper coil windings to further reduce heat transfer between the heated and the unheated portions of the tube. This insulation comprised approximately 50 millimeters of 1" wide by ½" thick Fiberfax roll insulation. The edge of the Fiberfax insulation matched exactly the level between the unheated and heated part of the 3-Zone Lindberg furnace, that is, between the bottom and center zones of the furnace. The furnace zones were 6", 12", and 6" in length, and a spike thermocouple was located at the midpoint of each zone. The operating conditions for the fluid bed CVD alumina coating of the phosphor control, Sample No. 1, are shown in Table II. The height of the phosphor bed was approximately 500 mm. The amount of phosphor charged into the column was 1500 gm. The external thermocouple was located against the outside wall of the quartz column level with the two micron diffuser where the oxygen/inert gas mixture enters the fluidized phosphor bed. The temperatures recorded by the external thermocouple during the coating operation ranged from 325° C. to 379° C. as shown in Table II. The first two furnace zones were set for 500° C. and the last zone was shut off. The fluid bed temperature was recorded by a thermocouple located within the fluid bed half-way between the distributor plate and the top of the expanded bed. The mid-bed temperature was from 385° C. to 410° C. during the 7½ hour run. The gasses that pass through the distributor plate at the bottom of the quartz column have flow rates as shown in Table II. For the bubbler, 1200 cc/min of an inert gas such as nitrogen, argon, helium, neon, or mixtures thereof and for the carrier, 1000 cc/min of the inert gas. A fluidized phosphor bed was formed by passing the inert gas upwardly through the phosphor particles in order to suspend the particles in the inert gas stream. In addition to supporting the phosphor particles in a fluidized bed, the inert gas functions as a carrier gas for the vaporized trimethyl aluminum. The inert gas was passed through the bubbler containing liquid trimethyl aluminum at approximately 30° C. and the liquid trimethyl aluminum was vaporized into the inert gas before passing through the distributor plate into the fluidized phosphor bed. A continuous protective alumina coating was formed on the surface of the individual phosphor particles when the vaporized trimethyl aluminum was exposed to the oxygen at a temperature sufficient for a reaction between the oxygen and the vaporized trimethyl aluminum to occur. The oxygen as an oxygen/inert gas mixture was introduced at 1500 cc/min. for O2 and 50 cc/min. for $N_2$ into the fluidized bed through the two micron filter elements located on the shaft of the vibrating mixer above the vibrating disc. The coating time was 7.5 hours as indicated in Table II. Once the phosphor particles were coated with a continuous coating of alumina, they were transferred into a quartz boat and annealed at 768° C. in static air and held at that temperature for 4 hours in a Rapid-Temp furnace. There is approximately a one hour linear ramp and cool down time programmed into the annealing heating cycle. The annealing temperature can be from about 700° C. to about 850° C. and the period of time held at temperature can be from about 15 minutes to about 20 hours. After the annealing step, at least one layer of the phosphor was coated in a 40W-T12 lamp using a conventional water base suspension system. The coated 40W-T12 lamp was then processed into a finished 40W-T12 lamp and zero hour lumen data was obtained, shown in Table I.

EXAMPLE 2

TABLE II

| | Process Conditions for CVD Alumina Coating Phosphor Particles | | | | | | |
|---|---|---|---|---|---|---|---|
| | Bed Height | | Bed | | Flow rates (cc/min) | | Coating |
| Sample | at Temp. | Charge | T.C. | Ex. T.C. | To Distributor | To Agitator | Time |
| No | mm | gm | °C. | °C. | Bubbler / Carrier | $O_2/N_2$ | Hr. |
| #1 | 500 | 1500 | 385/410 | 325-379 | 1250 / 1000 | 1500/50 | 7.5 |
| #2 | 300 | 300 | N.A. | 370-380 | 250 / 400 | 500/50 | 7.5 |
| #3 | 320 | 300 | N.A. | 380-413 | 300 / 350 | 500/50 | 6.25 |
| #4 | 320 | 315 | N.A. | 400-413 | 300 / 350 | 500/50 | 6.58 |
| #5 | 300-350 | 315 | N.A.· | 365-405 | 350 / 300 | 500/50 | 5.67 |
| #6 | 330 | 300 | N.A. | 342-356 | 300 / 350 | 500/50 | 6.25 |
| #7 | 400 | 375 | N.A. | 390-435 | 350 / 300 | 500/50 | 6.75 |

Approximately 0.5 Kg. of the same lot of the virgin manganese activated zinc silicate phosphor powder used in Example 1 was placed in a quartz boat and heated at 20° C./min to a temperature of 1225° C., in an ambient of static air. The phosphor was held at that temperature for approximately 16 Hrs., and was then cooled at 20° C./min to 900° C. and removed from the furnace. After cooling to room temperature, the partially sintered phosphor cake was roll crushed to a powder and sieved through a 60 mesh screen. The phosphor was subsequently loaded into a 2 liter (4.5"dia.×9"ht.) polyethylene mill jar containing 600 ml of citric acid solution (0.48w/o citric acid/gm phosphor) and 0.5 Kg. of burundum grinding cylinders (½"×½") and rolled at 91 rpm for 30 min. Upon completion of this wet milling process, the phosphor was separated from the citric acid solution by filtering and the phosphor was dispersed in 1.0 liter of distilled water. The phosphor was allowed to settle for 15 minutes and most of the water was decanted off, together with some of the fine phosphor particles that remained in suspension. The water dispersion and decanting process was then repeated a second time and was followed by a final dispersion in water and subsequent washing and suction drying on a buchner funnel. The phosphor received a final drying process in a 100° C. oven for at least 3 hours. Two weight percent of ammonium chloride was added to approximately 350 gm of the dried phosphor and blended. The blended mixture was then fired at a temperature of 1000° C. for 2 hours in air and cooled to room temperature. The partially sintered phosphor cake was roll crushed to a powder and sieved through a 60 mesh screen. The phosphor was subsequently loaded into a 2 liter (4.5"dia.×9"ht.) polyethylene mill jar containing 600 ml of citric acid solution (0.48w/o citric acid/gm phosphor) and 0.5 Kg. of burundum grinding cylinders (½"×½") and rolled at 91 rpm for 30 min. Upon completion of this wet milling process, the phosphor was separated from the citric acid solution by filtering and the phosphor was dispersed in 1.0 liter of distilled water. The phosphor was allowed to settle for 15 minutes and most of the water was decanted off, together with some of the fine phosphor particles that remained in suspension. The water dispersion and decanting process was then repeated a second time and was followed by a final dispersion in water and subsequent washing and suction drying on a buchner funnel. The phosphor received a final drying process in a 100° C. oven for at least 3 hours, and was ready for use after sieving through a 400 mesh screen. The reflectance and surface area data are shown in Table I, Sample No. 7. The phosphor, Sample No. 7, was then coated with alumina, annealed and incorporated into 40W-T12 fluorescent lamps. The zero hour lumen data for Sample No. 7 are also shown in Table I.

Figure 4:
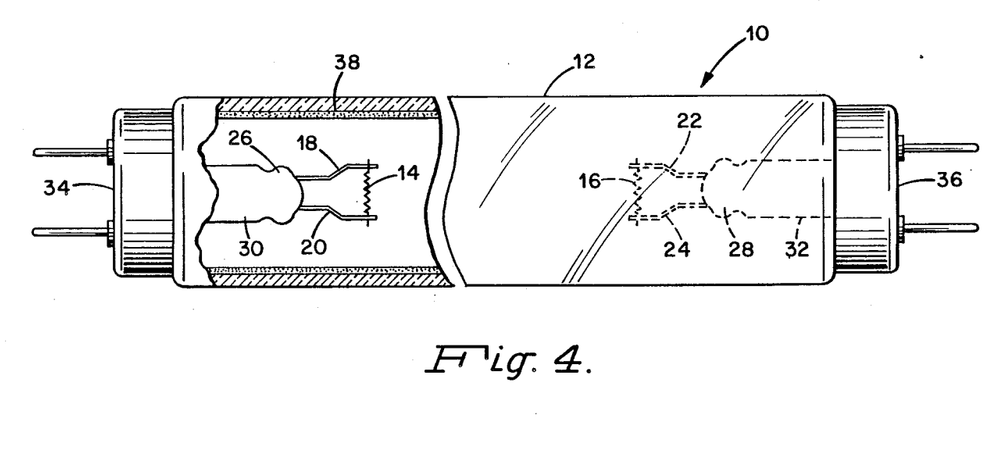
FIG. 4 a view of a fluorescent lamp, partially in section, diagrammatically illustrating the present invention.

Shown in FIG. 4 is a fluorescent lamp 10, such as a 40W-T12 fluorescent lamp. Lamp 10 comprises an elongated sealed glass envelope 12 of circular cross section containing electrodes 14 and 16 at each end supported by lead-in wires 18, 20 and 22, 24, respectively, which extend through glass presses 26, 28 in mount stems 30, 32 to the contacts in bases 34, 36 affixed to the ends of the lamp 10.

Envelope 12 is filled with an inert gas such as argon or a mixture of argon and neon at a low pressure, for example, two torr, and a small quantity of mercury, at least enough to provide a low vapor pressure of about six microns during operation.

The interior of envelope 12 is coated with a layer of phosphor 38, such as the manganese activated zinc silicate phosphor of Example 1 in accordance with the present invention.

A phosphor coating suspension was prepared by dispersing the phosphor particles in a water base system employing polyethylene oxide as the binder with water as the solvent.

The phosphor suspension was applied in the usual manner of causing the suspension to flow down the inner surface of envelope 12 and allowing the water to evaporate, leaving the binder and phosphor particles adhered to the envelope 12 wall. The phosphor coated envelope 12 was then heated in a lehr to volatilize the organic components, the phosphor layer 38 remaining on the envelope 12 wall.

Envelope 12 is processed into a fluorescent lamp by conventional lamp manufacturing techniques.

While we recognize that alternative explanations may be equally valid, we believe that the following theory best explains the operation of our invention. Not to be bound by theory, we hypothesize that during the thermal annealing process, wherein the $Al_2O_3$ coating is bonded to the phosphor particle, there occurs an interdiffusion of the chemical species making up the coating and the phosphor substrate. We further hypothesize that this interdiffusion causes a substantial reduction in the luminescence efficiency of the effected zone of the substrate. Moreover, because particle volume is directly proportional to the cube of the particle diameter, the diffusion effected zone will occupy a larger proportion of the total volume of small particles. As a consequence, the light output of small phosphor particles will be drastically reduced by interdiffusion, while its effect on the light output of the larger particles will be almost negligible. Based on this theory, we conclude that in order to maximize brightness after coating and annealing, virgin phosphors should have a minimum of smaller diameter particles and that both the reflectance measured at 275 nm and the BET surface area are affectations of the particle size distribution necessary to achieving optimum zero hour lumens (brightness) in the alumina coated and annealed condition. This conclusion is not unreasonable since the optical scattering coefficient is known to be particle size related. In Table I, it can be seen that the process of Example 1, which is responsible for a decrease in 275 nm reflectance from 16-10%, is also responsible for a substantial increase in particle size. The decreasing values of BET surface area listed in Table I reflects an increase in the particle size of phosphor particles as seen by SEM photomicrographs. The manganese activated zinc silicate particles are not spherical, rather they are porous, highly aggregated, serpentine or coral-like particles and that when they are measured by conventional particle sizing methods, unrealistic particle diameters result. This is not unexpected since most particle sizing instruments (Coulter Counter, Microtrak, etc.) assume a spherical particle morphology in deriving a particle diameter from some type of physical optical or electrical measurement. The morphology of manganese activated zinc silicate phosphor particles explains why a correlation between virgin phosphor particle size, as determined by one of the more conventional techniques, and the zero hour lumen output (brightness) of its alumina coated and annealed derivative, isn't obvious.

The absorption in the 300-400 nm range (see FIG. 1 curve (b)) as explained earlier, is associated with the use of tungsten as a phosphor ingredient; tungsten-free manganese activated zinc silicate phosphors do not absorb in this region. Moreover, this absorption may be associated with tungsten as a second phase or as a surface coating rather than just bulk (incorporated) tungsten. We hypothesize that tungsten and manganese can be left on the surface of the virgin (as synthesized) phosphor, as in Sample #1, Table I. The 4 hour heat treatment (Sample #2 - Table I), causes additional tungsten and manganese to diffuse to the surface of the phosphor where they are subsequently removed by the mill-wash and decantation process of Example 1, thereby eliminating most of the 300-400 nm absorption. If the heat treatment of Example 1 is extended for too long a period, as in Samples #3 through 6, the nature of the surface species are either chemically altered or build up to the point that the mill-wash is no longer capable of removing them, consequently increasing the 350 nm absorption. Both surface and bulk analyses support this hypothesis. Surface Analysis using ESCA (Electron Spectroscopy for Chemical Analysis) shows that the surface becomes richer in tungsten and manganese as a consequence of the 1225° C. heat treatment and that the surface concentration of both species are returned to their original values by the citric acid mill-wash. Furthermore, the tungsten assays show that tungsten is removed from the phosphor by the method of Example 1.

While there has been shown and described what is at present considered the preferred embodiment of the invention, it will be obvious to those skilled in the art that various changes and modifications may be made therein without departing from the scope of the invention as defined by the appended claims.

What is claimed is:

1. A manganese activated zinc silicate phosphor having cations consisting essentially of zinc, silicon, manganese, and tungsten prepared by a method comprising the following steps:

Step 1—heating in a furnace
a manganese activated zinc silicate phosphor powder having cations consisting essentially of zinc, silicon, manganese, and tungsten and having a 350 nm reflectance less than 80%, and a 275 nm reflectance greater than 13.5% in a furnace to a temperature of about 1000° C. to about 1225° C. in air;

Step 2—cooling said phosphor powder from Step 1;

Step 3—wet milling said phosphor powder from Step 2 in an acid solution;

Step 4—separating said phosphor powder from Step 3 from the acid solution;

Step 5—washing said phosphor powder from Step 4 with water;

Step 6—drying said phosphor powder from Step 5 to form a manganese activated zinc silicate phosphor powder having individual particles, a 350 nm reflectance equal to or greater than 80%, a 275 nm reflectance equal to or less than 13.5%, and a surface area from about 0.3 $m^2/gm$ to about 0.4 $m^2/gm$;

Step 7—coating said individual particles of said manganese activated zinc silicate phosphor powder with a continuous coating of alumina to form a manganese activated zinc silicate phosphor powder having a continuous coating of alumina on said individual particles;

Step 8—annealing said manganese activated zinc silicate phosphor powder having a continuous coating of alumina on said individual particles at a temperature of about 700° C. to about 850° C. for a period of about 15 min. to about 20 hours to form an annealed coated phosphor.

2. A fluorescent lamp comprising a light transmitting envelope having an inner wall, and inert ionizable gas and a charge of mercury therein said wall of said light transmitting envelope being coated with at least one layer of a phosphor prepared by a method comprising the following steps:

Step 1—heating a manganese activated zinc silicate phosphor powder having cations consisting essentially of zinc, silicon, manganese, and tungsten and having a 350 nm reflectance less than 80%, and a 275 nm reflectance greater than 13.5% in a furnace to a temperature of about 1000° C. to about 1225° C. in air;

Step 2—cooling said phosphor powder from Step 1;

Step 3—wet milling said phosphor powder from Step 2 in an acid solution;

Step 4—separating said phosphor powder from Step 3 from the acid solution;

Step 5—washing said phosphor powder from Step 4 with water;

Step 6—drying said phosphor powder from Step 5 to form a manganese activated zinc silicate phosphor powder having individual particles, a 350 nm reflectance equal to or greater than 80%, a 275 nm reflectance equal to or less than 13.5%, and a surface area from about 0.3 $m^2/gm$ to about 0.4 $m^2/gm$;

Step 7—coating said individual particles of said manganese activated zinc silicate phosphor powder with a continuous coating of alumina to form a manganese activated zinc silicate phosphor powder having a continuous coating of alumina on said individual particles;

Step 8—annealing said manganese activated zinc silicate phosphor powder having a continuous coating of alumina on said individual particles at a temperature of about 700° C. to about 850° C. for a period of about 15 min. to about 20 hours to form an annealed coated phosphor.

3. A fluorescent lamp in accordance with claim 2 wherein said one layer comprises a blend of phosphors, said blend of phosphors comprising at least one phosphor in accordance with claim 4.

4. A manganese activated zinc silicate phosphor powder having cations consisting essentially of zinc, silicon, manganese, and tungsten prepared by a method comprising the following steps:

Step 1—heating a manganese activated zinc silicate phosphor powder having cations consisting essentially of zinc, silicon, manganese, and tungsten and having a 350 nm reflectance less than 80%, and a 275 nm reflectance greater than 13.5% in a furnace to a temperature of about 1225° C. in air;

Step 2—cooling said phosphor powder from Step 1;

Step 3—wet milling said phosphor powder from Step 2 in an acid solution;

Step 4—separating said phosphor powder from Step 3 from said acid solution;

Step 5—washing said phosphor powder from Step 4 with water;

Step 6—drying said phosphor powder from Step 5;

Step 7—adding NH$_4$Cl to said phosphor powder from Step 6 to form a mixture of said NH$_4$Cl and said phosphor powder;

Step 8—heating said mixture of said NH$_4$Cl and said phosphor powder from Step 7 in a furnace to a temperature of about 1000° C. in air;

Step 9—cooling said phosphor powder from Step 8;

Step 10—wet milling said phosphor powder from Step 9 in an acid solution;

Step 11—separating said phosphor powder from Step 10 from said acid solution;

Step 12—washing said phosphor powder from Step 11 with water; and

Step 13—drying said phosphor powder from Step 12 to form a manganese activated zinc silicate phosphor powder having individual particles, a 350 nm reflectance equal to or greater than 80%, a 275 nm reflectance equal to or less than 13.5%, and a surface area from about 0.3 m$^2$/gm to about 0.4 m$^2$/gm;

Step 14—coating said individual particles of said manganese activated zinc silicate phosphor powder with a continuous coating of alumina to form a manganese activated zinc silicate phosphor powder having a continuous coating of alumina on said individual particles;

Step 15—annealing said manganese activated zinc silicate phosphor powder having a continuous coating of alumina on said individual particles at a temperature of about 700° C. to about 850° C. for a period of about 15 min. to about 20 hours to form an annealed coated phosphor.

5. A fluorescent lamp comprising a light transmitting envelope having an inner wall, and inert ionizable gas and a charge of mercury therein said wall of said light transmitting envelope being coated with at least one layer of a phosphor in accordance with claim 7 prepared by a method comprising the following steps:

Step 1—heating a manganese activated zinc silicate phosphor powder having cations consisting essentially of zinc, silicon, manganese, and tungsten and having a 350 nm reflectance less than 80%, and a 275 nm reflectance greater than 13.5% in a furnace to a temperature of about 1225° C. in air;

Step 2—cooling said phosphor powder from Step 1;

Step 3—wet milling said phosphor powder from Step 2 in an acid solution;

Step 4—separating said phosphor powder from Step 3 from said acid solution;

Step 5—washing said phosphor powder from Step 4 with water;

Step 6—drying said phosphor powder from Step 5;

Step 7—adding NH$_4$Cl to said phosphor powder from Step 6 to form a mixture of said NH$_4$Cl and said phosphor powder;

Step 8—heating said mixture of said NH$_4$Cl and said phosphor powder from Step 7 in a furnace to a temperature of about 1000° C. in air;

Step 9—cooling said phosphor powder from Step 8;

Step 10—wet milling said phosphor powder from Step 9 in an acid solution;

Step 11—separating said phosphor powder from Step 10 from said acid solution;

Step 12—washing said phosphor powder from Step 11 with water; and

Step 13—drying said phosphor powder from Step 12 to form a manganese activated zinc silicate phosphor powder having individual particles, a 350 nm reflectance equal to or greater than 80%, a 275 nm reflectance equal to or less than 13.5%, and a surface area from about 0.3 m$^2$/gm to about 0.4 m$^2$/gm;

Step 14—coating said individual particles of said manganese activated zinc silicate phosphor powder with a continuous coating of alumina to form a manganese activated zinc silicate phosphor powder having a continuous coating of alumina on said individual particles;

Step 15—annealing said manganese activated zinc silicate phosphor powder having a continuous coating of alumina on said individual particles at a temperature of about 700° C. to about 850° C. for a period of about 15 min. to about 20 hours to form an annealed coated phosphor.

6. A fluorescent lamp comprising a light transmitting envelope having an inner wall, and inert ionizable gas and a charge of mercury therein said wall of said light transmitting envelope being coated with at least one layer of a blend of phosphors, said blend of phosphors comprising at least one phosphor in accordance with claim 3 wherein said one layer comprises a blend of phosphors, said blend of phosphors comprising at least one phosphor in accordance with claim 4.

7. A manganese activated zinc silicate phosphor having cations consisting essentially of zinc, silicon, manganese and tungsten and having an absolute reflectance less than or equal to 13.5 percent at 275 nm, an absolute reflectance equal to or greater than 80 percent at 350 nm, and a surface area from about 0.3 m$^2$/gm to about 0.4 m$^2$/gm.

8. The phosphor according to claim 7 further comprising a continuous layer of alumina on each particle of said phosphor.

9. The phosphor according to claim 8 wherein said phosphor has been annealed at a temperature of about 700° C. to about 850° C. for a period of about 20 minutes to about 20 hours to form an annealed coated phosphor.

* * * * *